United States Patent
Davis et al.

(10) Patent No.: US 12,044,309 B1
(45) Date of Patent: Jul. 23, 2024

(54) METHOD FOR DETERMINING THE ROTATIONAL SPEED OF A NODE OF A TRANSMISSION

(71) Applicant: Sigma Powertrain, Inc., Livonia, MI (US)

(72) Inventors: R William Davis, Orion, MI (US); Graham Scott Russell, Clarkston, MI (US); Daniel E Knieper, Clarkston, MI (US); John W Kimes, Wayne, MI (US)

(73) Assignee: Sigma Powertrain, Inc., Livonia, MI (US)

( * ) Notice: Subject to any disclaimer, the term of this patent is extended or adjusted under 35 U.S.C. 154(b) by 0 days.

(21) Appl. No.: 18/458,573

(22) Filed: Aug. 30, 2023

Related U.S. Application Data

(60) Provisional application No. 63/402,426, filed on Aug. 30, 2022.

(51) Int. Cl.
*F16H 61/04* (2006.01)

(52) U.S. Cl.
CPC ................. *F16H 61/0437* (2013.01)

(58) Field of Classification Search
CPC ....... F16H 61/0437; F16H 59/38; F16H 59/46
See application file for complete search history.

(56) References Cited

U.S. PATENT DOCUMENTS

| | | | |
|---|---|---|---|
| 10,711,867 B1* | 7/2020 | Kimes | B60K 1/00 |
| 2016/0047466 A1* | 2/2016 | Otanez | F16H 59/40 |
| | | | 701/51 |
| 2016/0076643 A1* | 3/2016 | Pellerito | F16H 61/12 |
| | | | 701/62 |
| 2016/0348785 A1* | 12/2016 | Patenaude | F16H 61/0213 |

* cited by examiner

*Primary Examiner* — Edwin A Young
(74) *Attorney, Agent, or Firm* — Simonelli IP, PLLC

(57) ABSTRACT

A method calculates a rotational speed of a node of a linkage in a transmission allows the continued operation of the transmission even when rotational speeds are difficult to sense due to the lack of rotational speed. The method begins by sensing rotational speed at each node to define a sensed rotational speed for each node. The sensed rotational speed at each node is compared to a threshold rotational speed. The sensed rotational speed continues to be used if an absolute value of the sensed rotational speed of the node is greater than the threshold rotational speed. A calculated rotational speed is calculated when the sensed rotational speed is less than the threshold rotational speed. The sensed rotational speed value is replaced with the calculated rotational speed for the node when the sensed rotational speed is less than the threshold rotational speed.

3 Claims, 8 Drawing Sheets ated as
METHOD FOR DETERMINING THE ROTATIONAL SPEED OF A NODE OF A TRANSMISSION

BACKGROUND ART

1. Field of the Invention

The invention relates to a method for shifting between two gears of a transmission. More particularly, the invention relates to a method for releasing a clutch having digital coupling components.

2. Description of the Related Art

Transmissions in vehicles are used to control rotational torque to move the vehicle effectively and as efficiently as possible. Traditionally, transmissions employ hydraulic or pneumatic clutches (hydraulic clutches) to change gear ratios. Hydraulic clutches are, however, very inefficient in that much of the energy used to operate the hydraulic clutches is converted into thermal energy, much of which is dissipated into the atmosphere. In addition, hydraulic clutches require constant pressure to remain engaged, which further expends energy. This waste of energy is not acceptable in vehicles that use batteries as a primary energy source to create the motive force of the vehicle.

Digital clutches can be used to vastly reduce the amount of energy used during a change in gears of a transmission. Control of these digital clutches in the transmission are paramount to the proper function of the transmission. If a digital clutch does not transition properly, it could damage the transmission.

SUMMARY OF THE INVENTION

A method calculates a rotational speed of a node of a linkage in a transmission. The method begins by sensing rotational speed at each node to define a sensed rotational speed for each node. The sensed rotational speed at each node is compared to a threshold rotational speed. The sensed rotational speed continues to be used if an absolute value of the sensed rotational speed of the node is greater than the threshold rotational speed. A calculated rotational speed is calculated when the sensed rotational speed is less than the threshold rotational speed. The sensed rotational speed value is replaced with the calculated rotational speed for the node when the sensed rotational speed is less than the threshold rotational speed.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE DRAWINGS

Figure 1A:
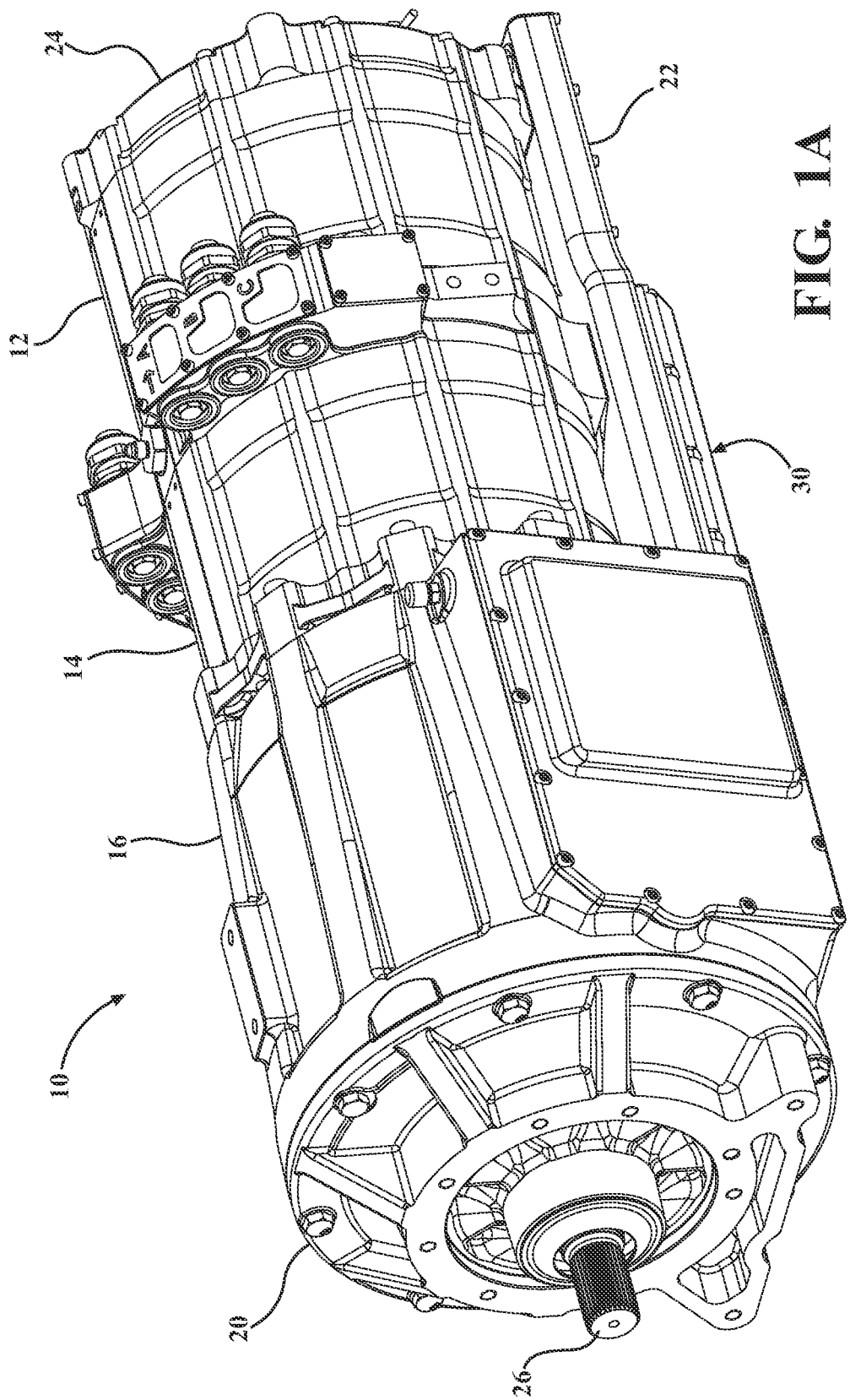
FIG. 1A is a perspective view of one embodiment of a vehicular powertrain.

For purposes of this discussion, elements will be identified by reference characters, typically reference numerals. There are a few embodiments shown in the Figures that will be described in detail below. For purposes of simplicity, these elements will retain their reference characters throughout the discussion. If an element has characteristics that are different from one embodiment to another, those differences will be discussed when introducing the same element for the new embodiment.

Referring to FIG. 1A, a perspective view of one embodiment of a transmission is generally shown at 10. In this Figure, the transmission 10 is operatively connected to a first motor 12 and a second motor 14. Physically, the second motor 14 is mounted to the transmission 10 between the transmission 10 and the first motor 12. The first motor 12 has an output (discussed subsequently) that extends through the second motor 14 and to the transmission 10.

Figure 1B:
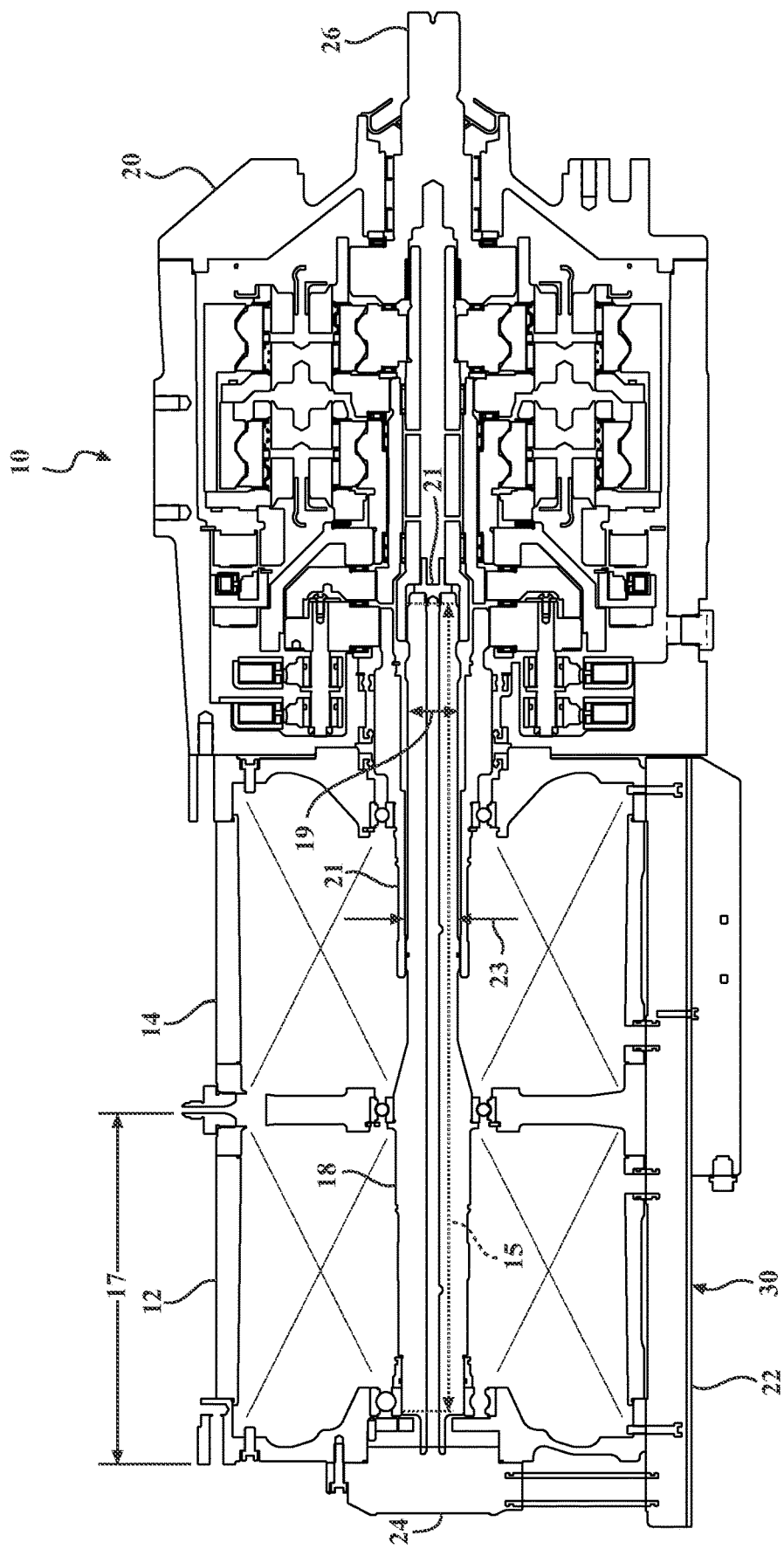
FIG. 1B is a schematic drawing of a cross-section of the embodiment shown in FIG. 1A.

The transmission 10 includes a transmission housing 16 having a housing cap 20. FIGS. 1A and 1B show the second motor 14 (B-Motor) secured to the transmission housing 16 and the first motor 12 (A-Motor) secured to the second motor 14 (B-Motor). A first motor output shaft 18 of the first motor 12 (A-Motor) defines a length 15 that is longer than a length 17 of the first motor 12. The first motor output shaft 18 also defines an outer diameter 19 at its distal end 21.

The second motor 14 (B-Motor) includes a second motor output shaft 21. The second motor output shaft 21 defines an inner diameter 23 that is larger than the outer diameter 19 of the first motor output shaft 18. The first motor output shaft 18 extends through and is coaxial with the second motor output shaft 21. It should be appreciated by those skilled in the art that the first motor output shaft 18 may not extend all the way through the second motor output shaft 21.

In alternative embodiments that will be discussed in greater detail below, the first 12 and second 14 motors may be mounted on either side of the transmission 10. Oil used to cool the transmission 10, the first motor 12 and the second motor 14 is collected by a catch basin 22 and recirculated using a pump 24, which is in fluid communication with the catch basin 22. Because the catch basin 22 extends along the entire length of the transmission 10, the first motor 12 and the second motor 14, only one pump 24 is necessary. The transmission 10 has an output shaft 26 that extends out through the center of the housing cap 20. Electrical ports (not shown) provide electrical access inside the first 12 and second 14 motors. The transmission 10, first motor 12, second motor 14, and pump 24 may be referred to as a powertrain, generally shown at 30. It should be appreciated by those skilled in the art that the powertrain v30 may only include one of the two motors 12, 14.

Figure 2:
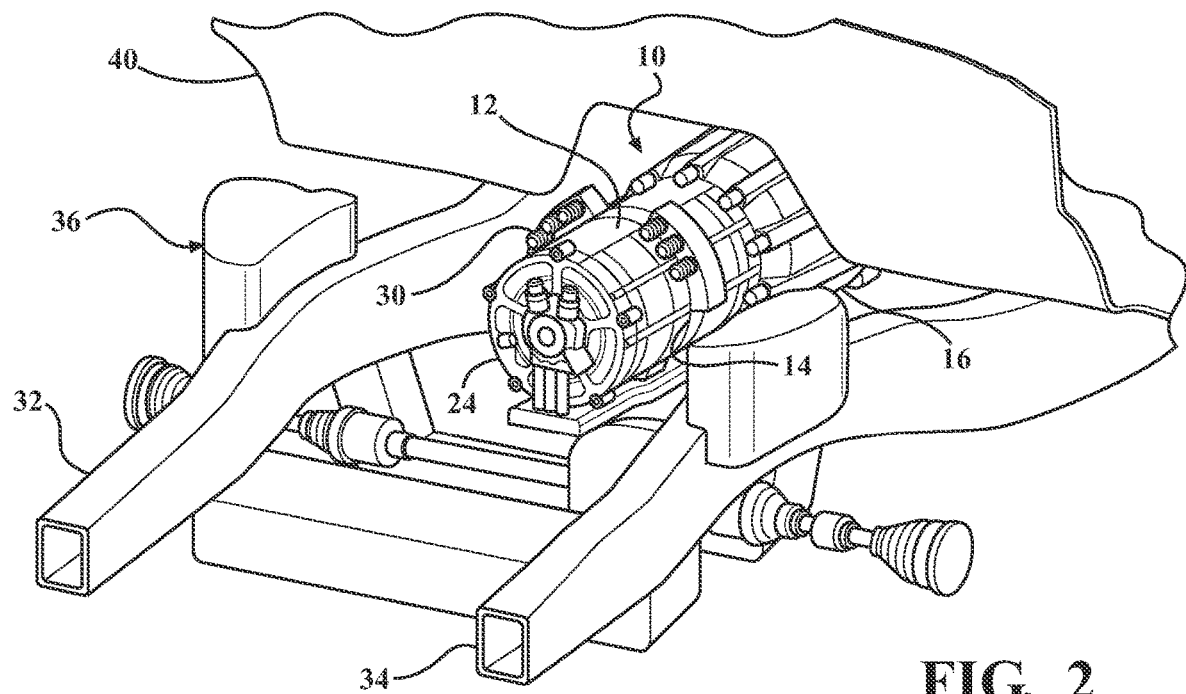
FIG. 2 is a perspective view of the powertrain embodiment shown in FIGS. 1A and 1B mounted to a vehicle.
Figure 3:
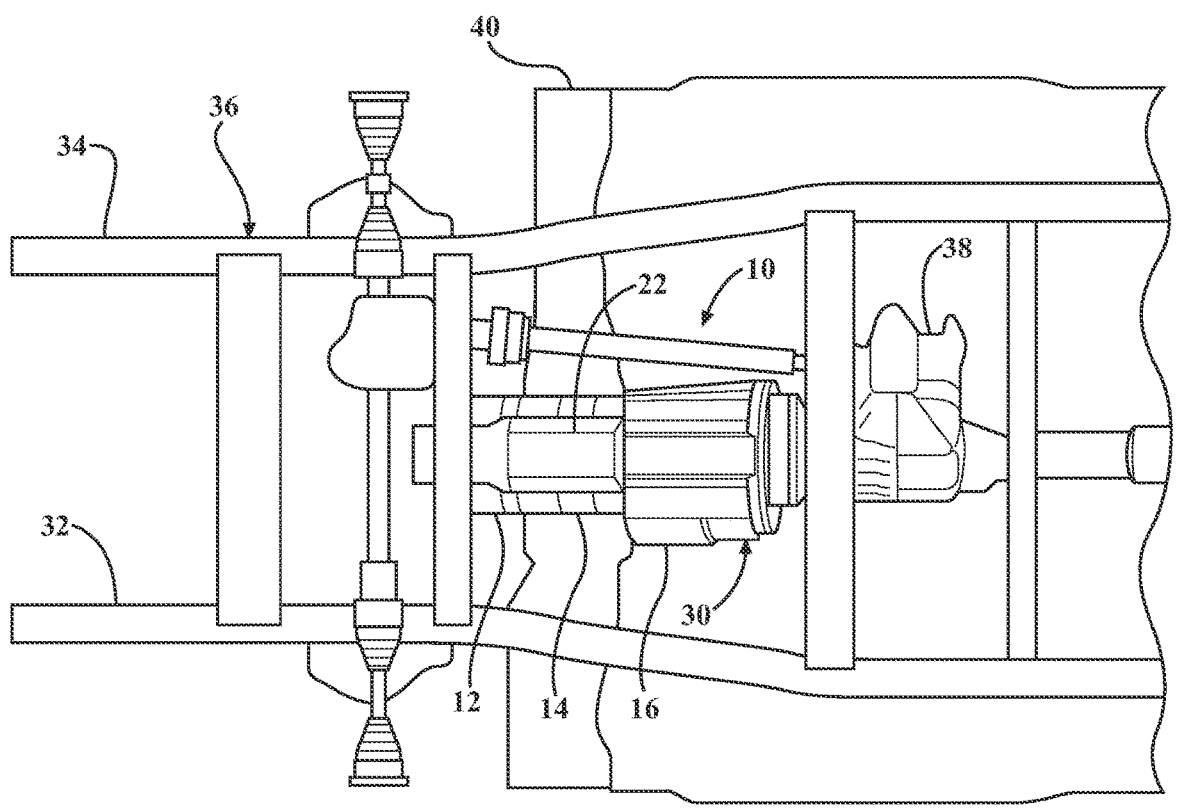
FIG. 3 is a bottom view of a vehicle with the powertrain embodiment shown in FIGS. 1A and 1B mounted thereto.

Referring to FIGS. 2 and 3, the powertrain 30 is shown mounted between two rails 32, 34 of a vehicular frame, generally shown at 36. A body 40, including a passenger compartment (not shown), is shown fixedly secured to the vehicular frame 36. Referring specifically to FIG. 3, the transmission 10 is shown connected to a drive line 38 that drives four wheels (none shown).

Figure 4:
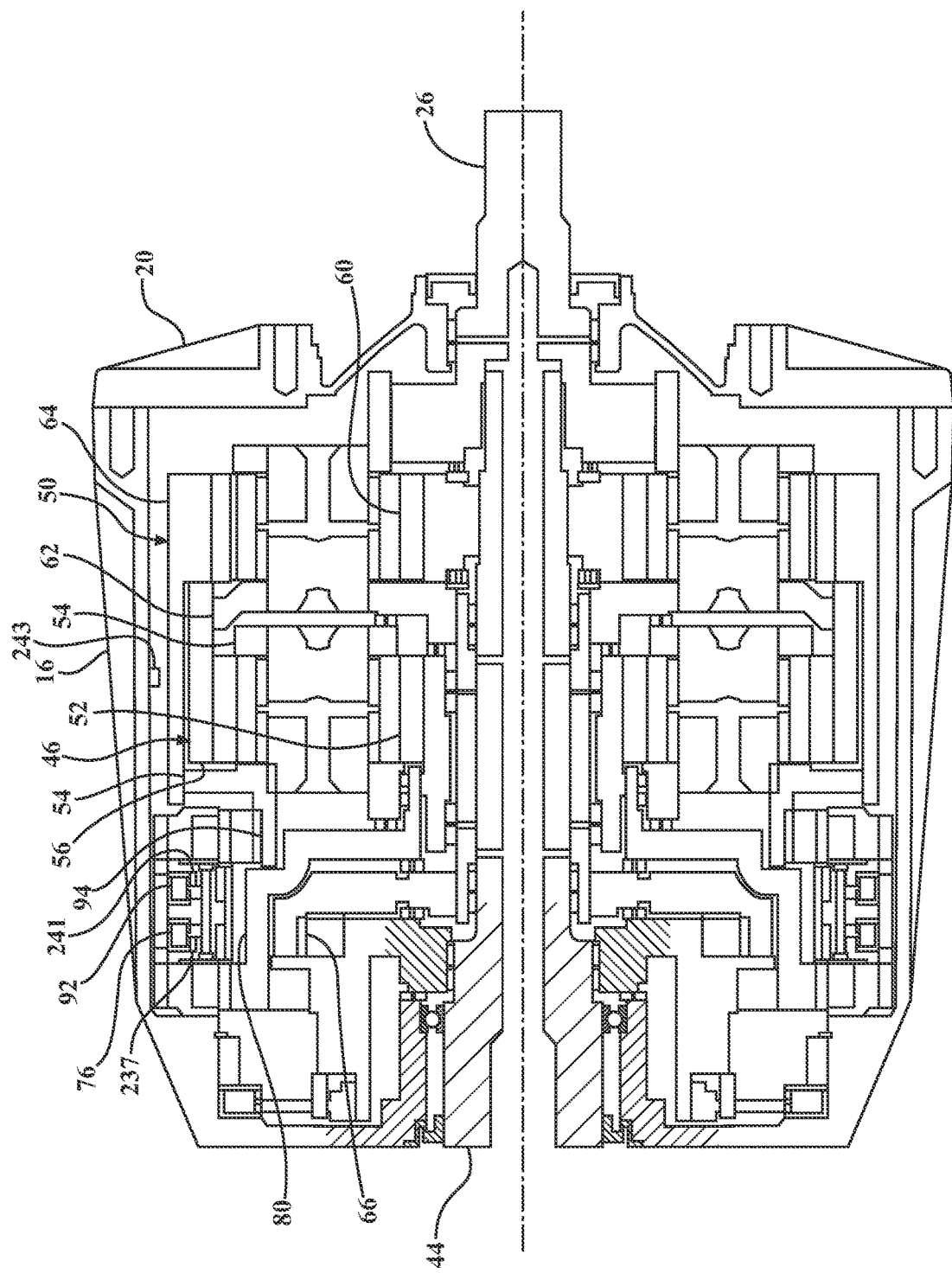
FIG. 4 is a cross-sectional side view of a transmission having one input.
Figure 5:
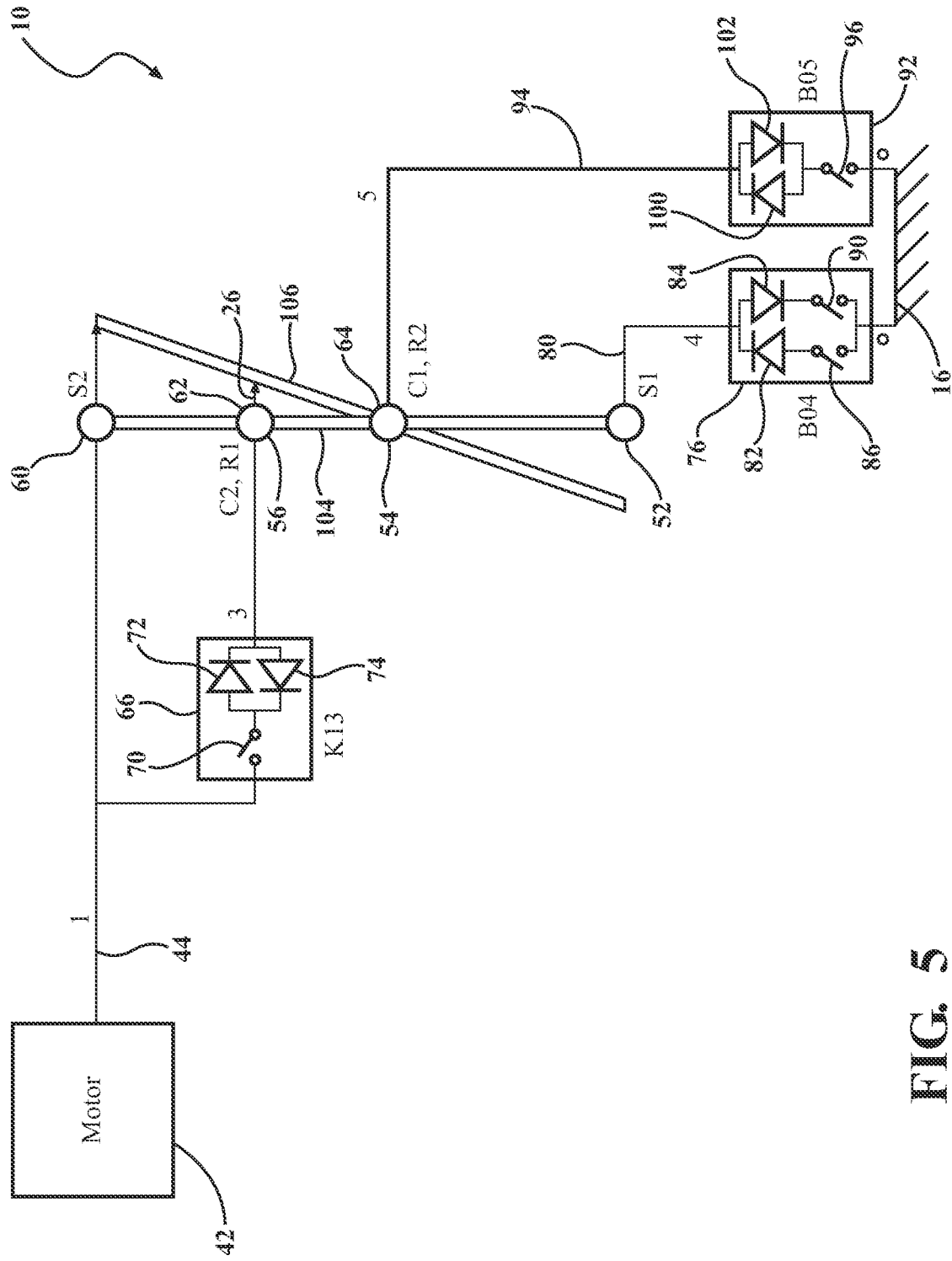
FIG. 5 is a lever diagram of one embodiment of a transmission having one embodiment.

Referring to FIGS. 4 and 5, the transmission 10 is shown in a configuration for operating with a single input. In this configuration, the single input is the first motor 12 fixedly secured directly to the transmission housing 16 in the absence of the second motor 14. The first motor 12 is not shown in FIG. 4, but the first motor output shaft 18 would receive the input shaft 44.

The input shaft 44 is also designated as shaft "1" in the power flow shown in FIG. 5. The transmission 10 also includes a first gearset, generally shown at 46, and a second gearset, generally shown at 50. The first gearset 46 includes first 52, second 54 and third 56 rotating members. The second gearset 50 includes a fourth 60, fifth 62, and sixth 64 rotating members. These gearsets 46, 50 may be any gearset that has three rotating members. Types of gearsets contemplated include, but are not limited to, Ravigneaux gearsets, Simpson gearsets and ring-carrier/ring-carrier gearsets. The gearsets 46, 50 shown in FIGS. 4 and 5 are ring-carrier/ring-carrier gearsets. Because these gearsets 46, 50 are ring-carrier/ring-carrier gearsets, the first 52, second 54 and third 56 rotating members are a sun gear, a carrier, and a ring gear, respectively. These are indicated as S1, C1, and R1 for the first gearset 46 and S2, C2, and R2 for the second gearset 50. Two rotating members from the first gearset 46 and two rotating members from the second gearset 50 are fixedly secured to each other. These connections create a four-node linkage for the transmission 10, with the nodes being the point where multiple elements of the gearset 46, 50 are connected. As such, each pair of rotating members is represented by a single circle in FIG. 5. Therefore, the first rotating member 56 (ring gear R1) and the fifth rotating member 62 (carrier C2) are fixedly secured to each other and represented by both reference numerals 56 and 62 in FIG. 5, whereas the second rotating member 54 (carrier C1) and the sixth rotating member 64 (ring gear R2) are fixedly secured to each other and represented by both reference numerals 54 and 64 in FIG. 5.

The output shaft 26 of the transmission 10 is also fixedly secured to two rotating members, one from each gearset 46, 50. In the embodiment shown in FIGS. 4 and 5, the output shaft 26 is fixedly secured to the third rotating member 56 (the ring gear R1 of the first gearset 46 and the fifth rotating member 62 of the second gearset 50 (the carrier C2 of the second gearset 50). The motor 12 is connected directly to the fourth rotating member 60 of the second gearset 50 using the input shaft 44 (shaft 1).

A controllable clutch 66 is connected between the input shaft 44 (shaft 1) at one end and the output shaft 26 (shaft 3) at the other end. The controllable clutch 66 is also represented by the nomenclature K13 because it couples shafts 1 and 3 together. Referring specifically to FIG. 5, the controllable clutch 66 is represented by a switch 70 and two diodes 72, 74. These three elements 70, 72, 74 represent the attributes of the controllable clutch 66. More specifically, the switch 70 signifies that the controllable clutch 66 may be turned on and off. The diodes 72, 74 represent the fact that the controllable clutch 66 will allow the third rotating member 56 (ring gear R1), the fifth rotating member 62 (second carrier C2) and the output shaft 26 (shaft 3) to lock in both directions, or to rotate freely in both directions. Therefore, when the switch 70 is closed, representing the active state for the controllable clutch 66, the output shaft 26 rotates with the rotation of the input shaft 44. When the switch 70 is open, representing an inactive state for the controllable clutch 66, the output shaft 26 does not rotate or, alternatively, rotates based on the torques it receives from the other rotating elements 52, 54, 60, 64 of the first 46 and second 50 gearsets.

The transmission 10 also includes a first controllable brake 76 (B04) that couples the first rotating member 52 (sun gear S1) of the first gearset 46 to the transmission housing 16. The first controllable brake 76 also has the symbol B04 because it is a brake that connects shaft 0 (which is just the transmission housing 16) with a fourth shaft 80 (shaft 4). The first controllable brake 76 (B04) is similar to the controllable clutch 66 in that it is represented by two diodes 82, 84 representing that it will lock and allow rotation in either direction. The first controllable brake 76 (B04) is different from the controllable clutch 66 in that each direction of operation can be controlled independently of the other, as represented by switches 86, 90. Operation of the first controllable brake 76 will be discussed in greater detail subsequently.

This transmission 10 also includes a second controllable brake 92 (B05) which couples the second rotating member 54 (carrier C1) of the first gearset 46 and the sixth rotating member 64 (ring R2) of the second gearset 50 to the transmission housing 16. The second controllable brake 92 differs from the first controllable brake 76 in that it only has the ability to control whether a notch plate 94 (shaft 5) is rotating or if it is tied to the transmission housing 16 and prevented from rotating. As such, the second controllable brake 92 only includes a single switch 96 representing the two states of the second controllable clutch 92 (B05) as being either on or off, and two diodes 100, 102 indicate that the second controllable brake 92 (B05) can lock or allow the notch plate 94 (shaft 5) to rotate in either direction.

Figure 6:
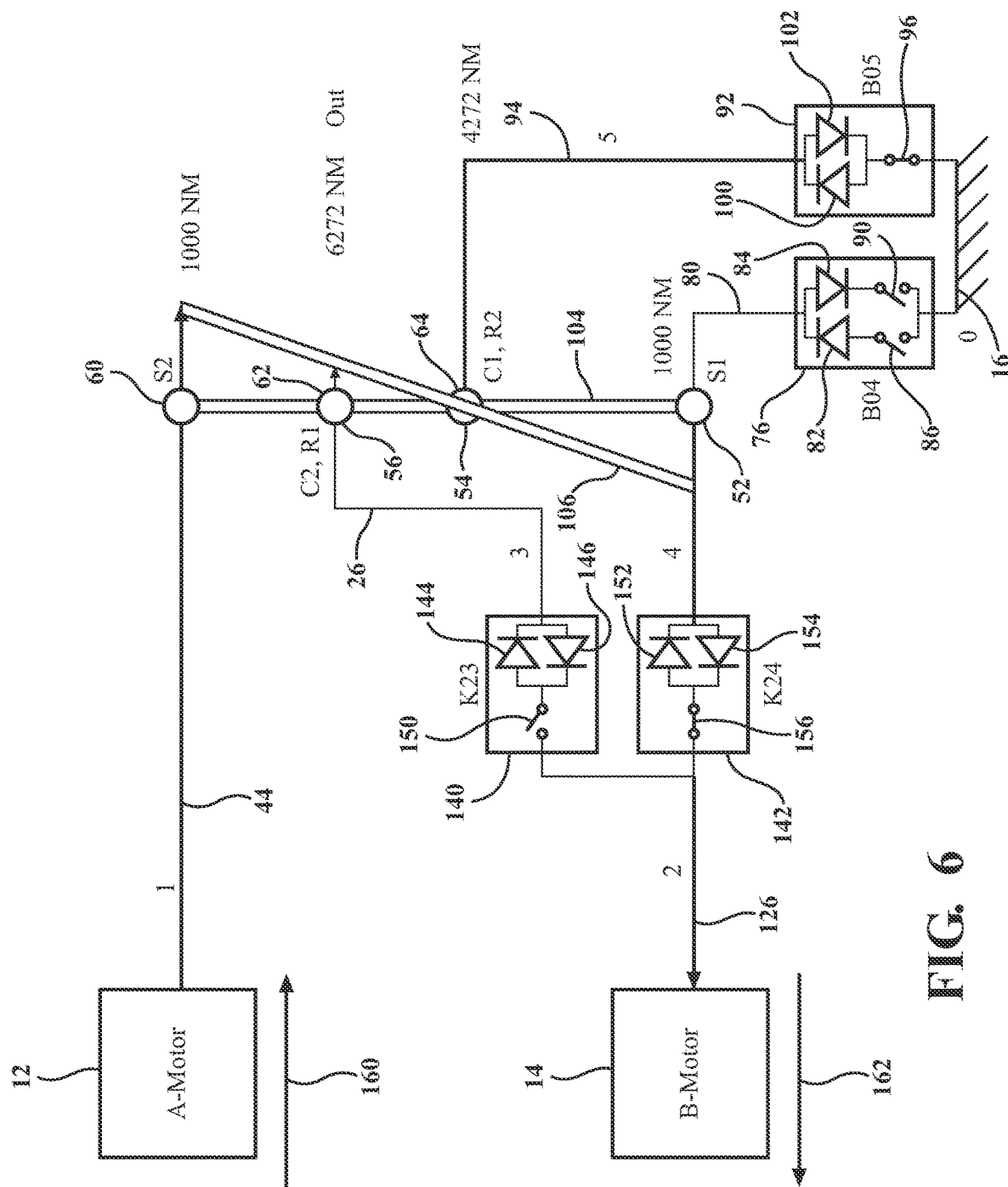
FIG. 6 is a lever diagram of one embodiment of a transmission having two inputs.

Referring to FIG. 6, a lever diagram showing the transmission 10 having two inputs (FIGS. 1A and 1B) is shown. The lever diagram is substantially similar to lever diagram for the single-input transmission shown in FIG. 5. One difference between the two configurations is the transmission 10 has two input shafts 44, 126, wherein the first input shaft 44 receives torque from the first motor 12 (A-Motor) and the second input shaft 126 receives torque from the second motor 14 (B-Motor). Another difference between the two configurations is the use of two controllable clutches 140 (K23), 142 (K24) instead of the single controllable clutch 66 (K13).

The output of the first motor 12 (A-Motor) is received by the first input shaft 44 (shaft 1), which is fixedly secured to the fourth rotating member 60 (sun gear S2) of the second gearset 50. The output of the second motor 14 (B-Motor) is received by the second input shaft 126 (shaft 2). The second input shaft 126 (shaft 2) is connected to the first controllable clutch 140 (K23) and the second controllable clutch 142 (K24). The first controllable clutch 140 (K23) operates in both directions as is indicated by the diodes 144, 146, which are oriented in opposite directions. A switch 150 illustrates that the clutch 140 (K23) is controllable and may be locked or allowed to rotate in both directions. The second controllable clutch 142 (K24) operates in both directions, as is indicated by the diodes 152, 154, which are oriented in opposite directions. A switch 156 illustrates that the controllable clutch 142 (K24) is controllable and may be locked or allowed to rotate in both directions.

The first controllable clutch 140 (K23) couples the second input shaft 126 (shaft 2) and the output shaft 26 (shaft 3). The second controllable clutch 142 (K24) couples the second input shaft 126 (shaft 2) with the fourth shaft 80 (shaft 4). As discussed above, the output shaft 26 is fixedly secured to both the third rotating member 56 (ring R1) of the first gearset 46 and the fifth rotating member 62 (carrier C2) of the second gearset 50.

The transmission 10 also includes a first controllable brake 76 (B04) that couples the first rotating member 52 (sun gear S1) of the first gearset 46 to the transmission housing 16. The first controllable brake 76 also has the symbol B04 because it is a brake that connects the transmission housing 16 (shaft 0) with a fourth shaft 80 (shaft 4). The first controllable brake 76 is similar to the controllable clutches 140, 142 in that it is represented by two diodes 82, 84 representing operation in either direction. The first controllable brake 76 is different from the controllable clutches 140, 142 in that each direction of operation can be controlled independently of the other, as represented by the two switches 86, 90. Operation of the first controllable brake 76 will be discussed in greater detail subsequently.

This transmission 10 also includes a second controllable brake 92 (B05) which couples the second rotating member 54 (carrier C1) of the first gearset 46 and the sixth rotating member 64 (ring R2) of the second gearset 50 to the transmission housing 16. The second controllable brake 92 differs from the first controllable brake 76 in that it only can control whether a notch plate 94 (shaft 5) is rotating, or if it is tied to the transmission housing 16 and prevented from rotating. As such, the second controllable brake 92 only includes a single switch 96 representing the two states of the second controllable clutch 92 (B05) as being either on or off, and two diodes 100, 102 indicate that the second controllable brake 92 (B05) can lock in both directions or it can move freely in both directions.

Because the first 46 and second 50 gearsets are ring-carrier/ring-carrier gearsets, the connections described in the power flow in FIG. 5, and the first 18 and second 19 motor output shafts are coaxial, the second motor 14 (B-Motor) is able to drive the output shaft 26 (shaft 3) directly. The number of modes of operation increase due to this capability. In the embodiments shown in the Figures, the first motor output shaft 18 extends through the second motor output shaft 19. As such, the second motor output shaft 19 is hollow providing a space through which the first motor output shaft 18 extends.

In FIG. 5, the steady-state lever 104 represent when the host vehicle is not in motion. The operational lever 106 represents when the vehicle is moving through the operation of the first motor 12 (A Motor) and/or the second motor 14 (B Motor). The first controllable clutch 140 (K23) is open as represented by the switch 150 being open. In addition, the second controllable clutch 142 (K24) is closed. Therefore, the second motor 14 (B Motor) is coupled to the first rotating member 52 (sun gear S1) of the first gearset 46. The first rotating member 52 (sun gear S1) is not grounded to the transmission housing 16 because the first controllable brake 76 (B04) is open. Finally, the second controllable brake 92 (B05) is closed tying the second rotating member 54 (carrier C1) of the first gearset 46 and the sixth rotating member 64 (ring gear R2) of the second gearset 50 to the transmission housing 16 through the notch plate 94 (shaft 5). In other words, the second member 54 (carrier C1) of the first gearset 46 and the sixth rotating member 64 (ring gear R2) of the second gearset 50 are grounded.

In this configuration, the first motor 12 is operating in the forward direction, indicated by arrow 160, and the second motor 14 is operating in the reverse direction, indicated by arrow 162. By way of example, and in not to be limiting, exemplary torques are provided based on the designs of the gearsets 46, 50 and the motors 12, 14. Given the output of the first motor 12 (A Motor) provides a torque of 1000 NM on the second sun gear 60 (sun gear S2) and the output of the second motor 14 provides a torque of 1000 NM in the opposite direction on the first rotating member 52 (sun gear S1) results in a torque of 4272 NM on the second rotating member 54 (carrier C1) of the first gearset 46 and the sixth rotating member 64 (ring gear R2) of the second gearset 50 and an output torque of 6272 NM at the output shaft 26. This is "first gear." The transmission 10 is more fully described in U.S. Pat. No. 10,711,867, which is co-owned by Applicant, and the disclosure therein is expressly incorporated herein by reference.

Figure 7:
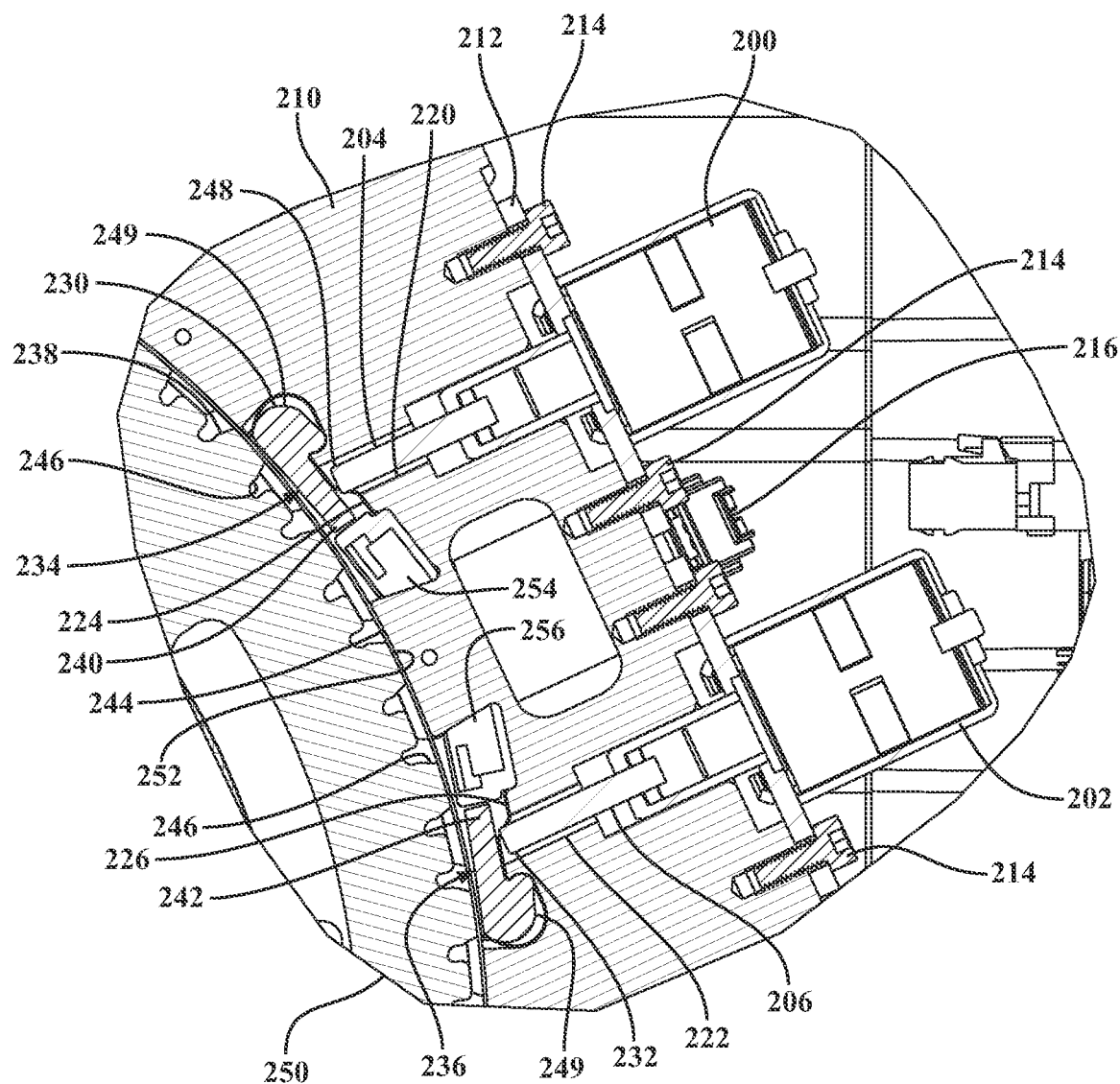
FIG. 7 is a cross-sectional side view, partially cut away, of first and second directional struts used to control elements of a clutch in their respective extended positions.

Referring to FIG. 7, clutch elements of the transmission 10 are shown. The clutch elements may be used for either brake clutches or controllable clutches. In the embodiment shown, the clutch elements are a part of the first controllable brake 76 (B04). It should be appreciated by those skilled in the art that these clutch elements could be used with any of the independently controllable clutches used in this transmission 10.

Referring specifically to FIG. 7, the clutch elements shown include first 200 and second 202 actuators. In the embodiment shown, the first 200 and second 202 actuators are solenoids, each having a plunger 204, 206, respectively. The actuators 200, 202 are fixedly secured to a pocket plate 210 using a mounting plate 212 and a plurality of bolts 214. Electrical power to and control of the two actuators 200, 202 come through a communications module as represented by a wire harness connector 216 as is known in the art. The plungers 204, 206 extend through channels 220, 222, respectively, in the pocket plate 210 and into first 224 and second 226 pockets disposed adjacent to an inner diameter 244 of the pocket plate 210. The channels 220, 222 allow the plungers 204, 206 to move axially between respective retracted positions (FIG. 7) and extended positions (not shown) wherein distal ends 230, 232 of the plungers 204, 206 extend into the pockets 224, 226 of the pocket plate 210. The plungers 204, 206 and channels 220, 222 are linear and the plungers 204, 206 move back and forth along the channels 220, 222, but they 204, 206, 220, 222 may or may not be radial extensions of the notch plate 250.

In each of the first 224 and second 226 pockets are first 234 and second 236 directional struts. The struts 234, 236 reside in the pockets 224, 226. In their retracted positions, the struts 234, 236 are completely within their respective pockets 224, 226. When the struts 234, 236 pivot, an engagement portion 240, 242 of the struts 234, 236 move out beyond the pockets 224, 226 past a pocket plate inner diameter 244 and into notches 246 of a notch plate 250 having an outer diameter 252 slightly smaller than the pocket plate inner diameter 244. More specifically, the engagement portions 240, 242 of the struts 234, 236 engage respective notch walls 238, 239 of the notches 246. Position modules 254, 256 identify the position of the struts 234, 236. Examples of position sensors are described in US patent application owned by Applicant, having Ser. No. 17/495,062, the specification of which is hereby incorporated by reference. It should be appreciated by those skilled in the art that a clutch may include a plurality of these actuator/strut pairs and only a pair of these actuator/strut assemblies are shown in the Figures for purposes of simplicity.

Speed sensors 237, 241, 243 (only three shown) measure the rotational speed of either a portion of the nodes 52, 54, 56, 60, or all of the nodes 52, 54, 56, 60. In the embodiment shown, the speed sensors 237, 241, 243 can use the notches 246 as teeth. It should be appreciated by those skilled in the art that teeth dedicated to sensing speed may also be used.

In most general terms, the time between teeth passing the sensor establishes a period between teeth. The reciprocal of the period is the rotational velocity of the element being measured.

However, the use of speed sensors 237, 241, 243 becomes difficult to rely on when measuring speeds near zero. Rotational speeds near zero increase the possibility for error. Therefore, a second method of identifying the rotational speed at a node is necessary. This second method of identifying a rotational speed is employed when a sensor fails to output a sensor signal that is accurate or reliable.

In FIGS. 5 and 6, we discussed the operation of a powertrain 30 in terms of nodes 52, 54, 56, 60 and a lever; the lever being shown twice in each Figure in different orientations (104, 106) based on the state of operation in which the powertrain 30 is operating. Because the transmission 10 can be represented by a lever diagram (and are ratios of each other relative to their gear ratios), the speeds of the various nodes 52, 54, 56, 60 of the transmission 10 can be expressed or calculated based on the linear relationships therebetween. This linear relationship provides a basis against which an expected speed can be compared. In the embodiments shown in the Figures, there are three measured nodes and a measured speed of another node through the motor controller as there is a direct linkage at that node 60. As such, speed can be sensed at each of the four nodes 52, 54, 56, 60.

The expected speed of any of the four nodes can be expressed as a function of any two of the other three values and the gear ratios between them. Using this characteristic, it can be determined if one of the sensors 237, 241, 243 is malfunctioning. If a value is not what is expected, a substitute value can be calculated. This calculated value can be used instead of the sensed speed.

Similarly, because the accuracy near zero speed is compromised by the nature of the method of sensing rotational speed, a more accurate speed can be calculated from two of the other nodes 52, 54, 56, 60 (assuming they are currently faster). This calculated value is used in the control of the shifts. The method is functional whenever both of the other nodes 52, 54, 56, 60 measure a rotational speed higher than the rotational speed of the node 52, 54, 56, 60 in question.

Figure 8:
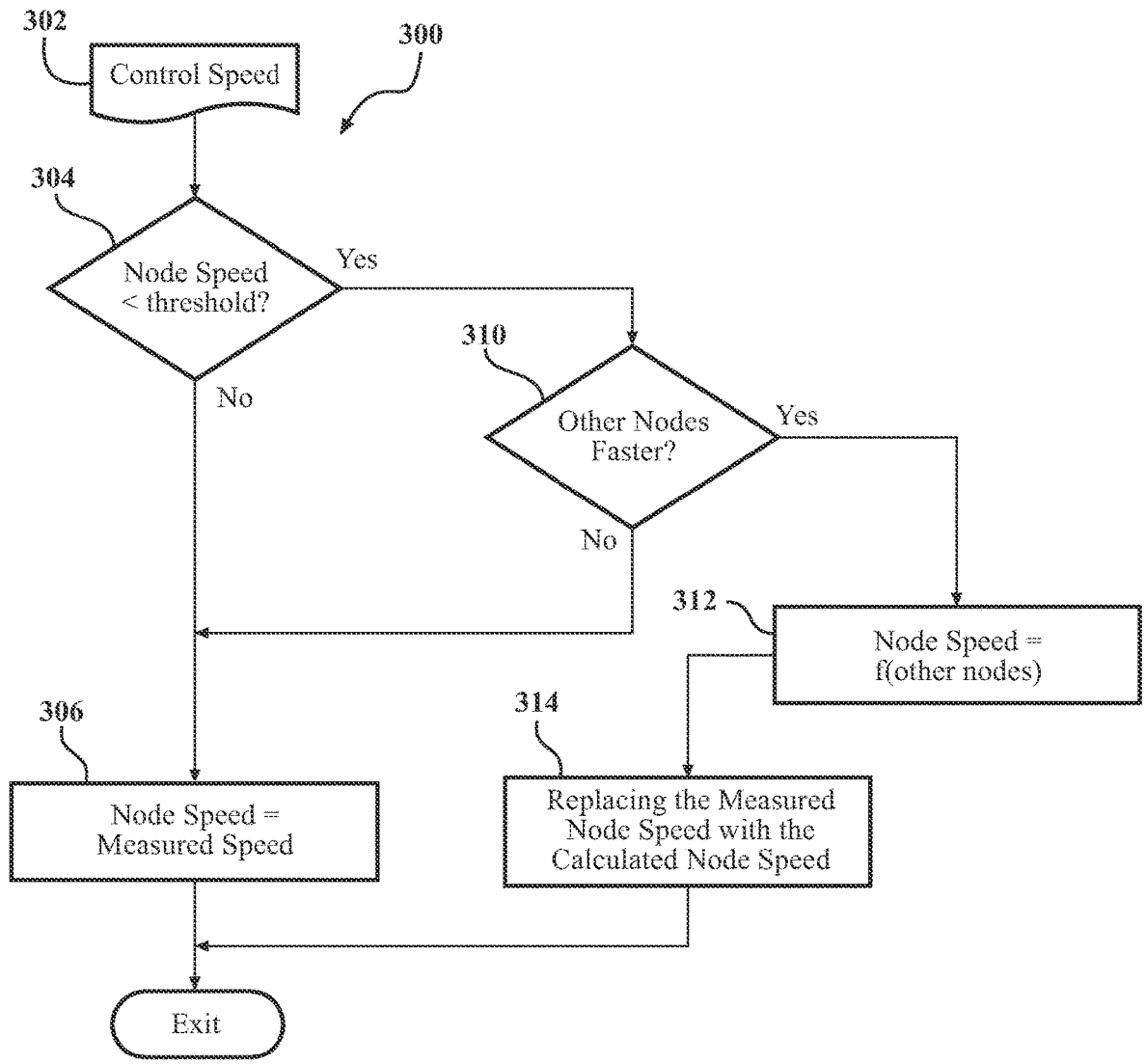
FIG. 8 is a flow chart of a method to measure and/or calculate the rotational speed of each node in the transmission of Figures.

Referring to FIG. 8, the method is generally shown at 300. The method 300 begins at 302 when a control speed command is issued. At decision diamond 304, it is determined whether a sensed rotational speed of one of the nodes 52, 54, 56, 60 is less than a predetermined value or threshold. If the sensed rotational speed of one of the nodes 52, 54, 56, 60 is greater than the predetermined threshold, then the method 300 confirms the sensed rotational speed of one of the nodes 52, 54, 56, 60 is the speed that is sensed by the sensors 237, 241, 243 at 306. The method 300 then terminates or loops back for new measurements as is needed given the operation of the powertrain 30.

If, at decision diamond 304, it is determined that the sensed rotational speed of one of the nodes 52, 54, 56, 60 is less than the predetermined value or threshold, then the method 300 determines whether sensed rotational speeds of two of the other nodes 52, 54, 56, 60 are measured at rotational speeds faster than the node 52, 54, 56, 60 in question. In one embodiment, the predetermined threshold value is 400 revolutions per minute (RPM). This number may vary depending on the specific design parameters of the powertrain 30, and it may even depend on the specific node 52, 54, 56, 60 being measured. In other words, it is contemplated that individual nodes may have independent predetermined thresholds above which the method 300 will pass on that value as the measured value. The method 300 does this at decision diamond 310. If not, the method 300 again returns to step 306 and accepts the sensed rotational speed of one of the nodes 52, 54, 56, 60 as being what was measured by one the speed sensors 237, 241, 243.

If it is determined that two of the other nodes 52, 54, 56, 60 are rotating at a faster rate than the node 52, 54, 56, 60 in question, the method 300 then calculates at 312 what the rotational speed of one of the nodes 52, 54, 56, 60 should be. This is a calculated rotational speed. The sensed rotational speed value is replaced by the calculated rotational speed value at 314. Because the levers 104, 106 are linear in nature, and because there are four nodes 52, 54, 56, 60 are on this line, the rotational speed of any one node 52, 54, 56, 60 can be represented algebraically as a function of the rotational speeds of any two of the other nodes 52, 54, 56, 60.

The slope of a linear equation for the lever 104, 106 is explained in "Using Lever Analogy Diagrams In Teaching Compound Planetary Gear Trains," American Society for Engineering Education, 2006-1084, pp. 11.1393.1-11 (2006).

It should be appreciated by those skilled in the art that other equations and/or relationships may be used to determine the rotational speed of the nodes 52, 54, 56, 60. The relationship defined by the equation is based on the relationship between the gearsets and the nodes.

The method 300 begins again at 302. The method 300 will stop using the calculated rotational speed value and return to the use of a sensed rotational speed value once that sensed rotational speed value exceeds the predetermined threshold. The method 300 may use more than two of the nodes 52, 54, 56, 60 to calculate the rotational speed of a node 52, 54, 56, 60 that has dropped below the predetermined threshold. And while the rotational speed of the fourth node 60 (the fourth rotating member 60 of the second gearset 50) can be measured by measuring the rotational speed of the first motor 12, it is desirable to measure the rotational speed of the fourth node 60 at the fourth node 60 and not at the first motor 12.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We claim:

1. A method for calculating a rotational speed of a node of a linkage in a transmission including a plurality of nodes, the method including the steps of:

sensing a rotational speed at each node to define a sensed rotational speed;

comparing the sensed rotational speed at each node to a threshold rotational speed;

continuing use of the sensed rotational speed if an absolute value of the sensed rotational speed of the node is greater than the threshold rotational speed;

calculating a calculated rotational speed when the sensed rotational speed is less than the threshold rotational speed;

replacing the sensed rotational speed with the calculated rotational speed for that node when the sensed rotational speed is less than the threshold rotational speed; and forwarding the calculated rotational speed for the node to the transmission for operation of the transmission while the sensed rotational speed of the node is less than the threshold rotational speed.

2. The method as set forth in claim 1, wherein the step of calculating the calculated rotational speed occurs after a step of determining when the sensed rotational speed of the one node is less than sensed rotational speeds of at least two other nodes.

3. The method as set forth in claim 2 including a step of replacing the calculated rotational speed of the node with a subsequent sensed rotational speed of the node when the subsequent sensed rotational speed of the node is greater than the rotational speed threshold.

* * * * *